(12) United States Patent
Larson et al.

(10) Patent No.: US 10,761,936 B2
(45) Date of Patent: *Sep. 1, 2020

(54) VERSIONED RECORDS MANAGEMENT USING RESTART ERA

(71) Applicant: MICROSOFT TECHNOLOGY LICENSING, LLC, Redmond, WA (US)

(72) Inventors: Per-Ake Larson, Redmond, WA (US); Robert Patrick Fitzgerald, Fall City, WA (US); Cristian Diaconu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/948,215

(22) Filed: Apr. 9, 2018

(65) Prior Publication Data

US 2018/0232281 A1     Aug. 16, 2018

Related U.S. Application Data

(63) Continuation of application No. 15/001,088, filed on Jan. 19, 2016, now Pat. No. 9,952,931.

(51) Int. Cl.
*G06F 11/14* (2006.01)
*G06F 16/23* (2019.01)

(52) U.S. Cl.
CPC ...... *G06F 11/1417* (2013.01); *G06F 11/1438* (2013.01); *G06F 11/1441* (2013.01); *G06F 11/1469* (2013.01); *G06F 11/1474* (2013.01); *G06F 16/2365* (2019.01); *G06F 2201/80* (2013.01); *G06F 2201/84* (2013.01)

(58) Field of Classification Search
CPC ............ G06F 11/1417; G06F 11/1438; G06F 11/1441; G06F 11/1469; G06F 11/1474; G06F 16/2365
USPC ........... 707/686, 661, 674, 999.202, 999.203
See application file for complete search history.

(56) References Cited

U.S. PATENT DOCUMENTS

| | | | |
|---|---|---|---|
| 7,124,302 B2 * | 10/2006 | Ginter | G06F 21/10 713/189 |
| 2002/0049883 A1 * | 4/2002 | Schneider | G06F 21/80 711/100 |
| 2002/0103815 A1 * | 8/2002 | Duvillier | G06F 16/2358 |
| 2004/0167940 A1 * | 8/2004 | Margolus | G06F 16/2358 |

(Continued)

*Primary Examiner* — Dung K Chau
(74) *Attorney, Agent, or Firm* — Workmann Nydegger

(57) ABSTRACT

A versioned records management system that uses a restart era in order to promote rapid recovery. A persistent store includes a plurality of items that are each marked with a restart era. Any item that was created in the current restart era is marked with the current restart era. The persistent store also includes a first subset of the items comprising a plurality of records. At least one record includes multiple corresponding versions. The persistent store also includes a second subset of the items comprising a collection of objects that conform to an object model that is used to operate upon the plurality of records via the object collection. The versioned records management system recovers from a crash by promoting an item in the persistent store to the current restart era, in parallel with normal operation of the versioned records management system.

20 Claims, 5 Drawing Sheets

(56) References Cited

U.S. PATENT DOCUMENTS

| | | | | |
|---|---|---|---|---|
| 2007/0288247 | A1* | 12/2007 | Mackay | G06Q 10/00 705/1.1 |
| 2010/0250497 | A1* | 9/2010 | Redlich | F41H 13/00 707/661 |
| 2012/0069131 | A1* | 3/2012 | Abelow | G06Q 10/067 348/14.01 |
| 2013/0073821 | A1* | 3/2013 | Flynn | G06F 3/061 711/162 |
| 2013/0332660 | A1* | 12/2013 | Talagala | G06F 12/0246 711/103 |
| 2016/0171042 | A1* | 6/2016 | Bendel | G06F 16/122 707/703 |

* cited by examiner

VERSIONED RECORDS MANAGEMENT USING RESTART ERA

CROSS-REFERENCE TO RELATED APPLICATION

This application is a continuation of U.S. application Ser. No. 15/001,088, filed Jan. 19, 2016, and entitled "VERSIONED RECORDS MANAGEMENT USING RESTART ERA," and which issues as U.S. Pat. No. 9,952,931 on Apr. 24, 2018. The entire contents of the foregoing application are incorporated by reference herein in their entirety.

BACKGROUND

Computers and networks have ushered in what has been called the "information age". The ability to persist information in some type of data store a key enabler of this age. Even if power is lost to the data store, the data is persisted such that the next time the power is restored, the data remains preserved as it was. This is important as systems that provide power to the power store cannot be expected to operate indefinitely. For instance, disk storage on a laptop is provided to persist data since laptop users can be expected to (and really should on occasion) power down their laptop. Disk-based storage (originally rotating disk, but then solid state disks) have been in widespread use for some time. Reads from and writes to the disk-based storage is typically done via canonical disk Input/Output (I/O) commands.

Computing systems also include system memory, which is coupled to the processor(s) of the computing system over a memory bus. The processor reads data from (and writes data to) memory locations within the system memory over the memory bus. The processor also provides the address of the location being written to or read from over the memory bus. The processor might typically include one or more caches for faster reads and writes of data that is available in the cache.

Traditionally, such system memory has been volatile memory, in which data is lost when power is no longer supplied. More recently, however, persistent main memory has been developed, which is a persistent form of system memory. When power is lost, the information within the system memory remains intact. Nevertheless, because the caches remain volatile, the information within the caches is often lost.

After an uncontrolled power down of a computing system, the computing system undergoes a process called "recovery". Recovery mechanisms can take some time. Some recovery mechanisms are optimized to try to shorten the time to begin the first task of normal operation after the uncontrolled power down. Other recovery mechanisms are optimized to shorten the time to optimum performance after the uncontrolled power down.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a versioned records management computing system that uses a restart era in order to promote rapid recovery. Whenever the versioned records management computing system recovers after a crash, the restart era is altered. The system has a persistent store that includes multiple items that are each marked with a restart era. The persistent store also includes the identification of the current restart era.

The persistent store includes a multi-versioned record collection that includes records of a collective variety of versions. The records are also associated with a restart era. Any record that was created in the current restart era is marked with the current restart era. On the other hand, the restart era of a record created in a prior restart era does not change instantaneously at the moment of restart. Accordingly, there is an automatically in place a mechanism to distinguish those previously existing records that are to be evaluated for garbage collection, from those items that are visible in the current era, and are thus subject to normal garbage collection that acts on items marked in the current restart era.

The system also includes an object collection media having thereon an object collection that conforms to an object model such that the object model is used to operate upon the records. The object collection media is operable such that the object collection is durable so as to survive restarts of the system. During normal operation, the system performs at least some atomic operations upon the object collection. Accordingly, in case of an impending crash, the object collection is durable and in a consistent state, and is thus available for use consistent with the object model in subsequent recovery of the versioned records management computing system. Furthermore, the visibility of the records is not affected by the record having a prior restart era. Accordingly, the entire record collection and the object collection used to operate thereon are almost immediately available. Thus, normal operations of the system may be resumed more quickly. Meanwhile, marking particular items to promote the items to the current restart era, and thereafter sweeping the unmarked items that have not been promoted to the current restart era, may be done in parallel with normal operations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
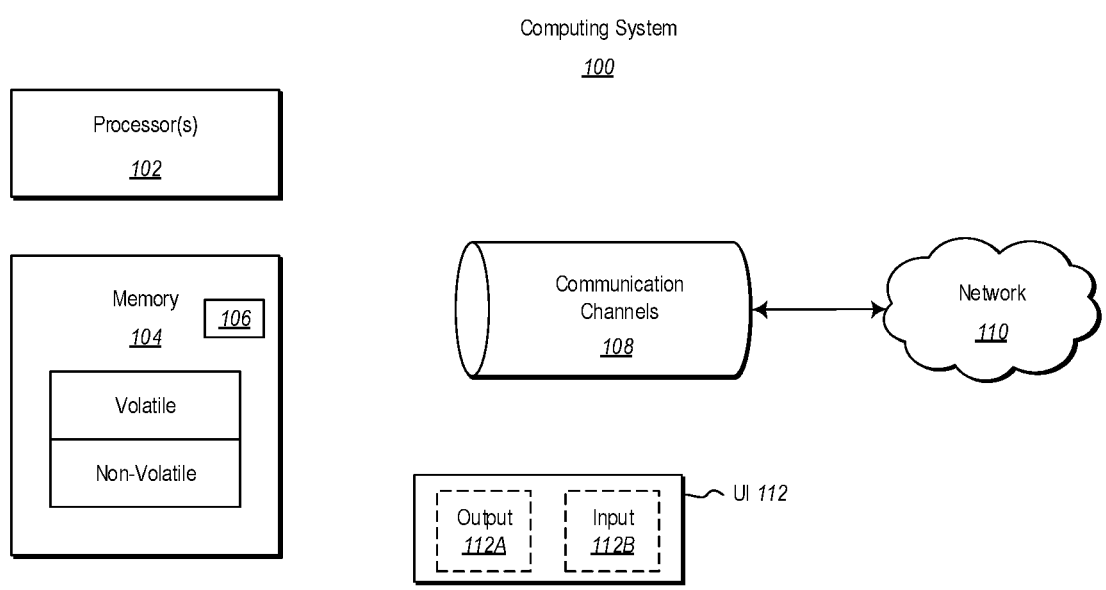
FIG. 1 illustrates an example computing system in which the principles described herein may be employed.

At least some embodiments described herein relate to a versioned records management computing system that uses a restart era in order to promote rapid recovery. Whenever the versioned records management computing system recovers after a crash, the restart era is altered. The system has a persistent store that includes multiple items that are each marked with a restart era. The persistent store also includes the identification of the current restart era.

The persistent store includes a multi-versioned record collection that includes records of a collective variety of versions. The records are also associated with a restart era. Any record that was created in the current restart era is marked with the current restart era. On the other hand, the restart era of a record created in a prior restart era does not change instantaneously at the moment of restart. Accordingly, there is an automatically in place a mechanism to distinguish those previously existing records that are to be evaluated for garbage collection, from those items that are visible in the current era, and are thus subject to normal garbage collection of the garbage collection that acts on items marked in the current restart era.

The system also includes an object collection media having thereon an object collection that conforms to an object model such that the object model is used to operate upon the records. The object collection media is operable such that the object collection is durable so as to survive restarts of the system. During normal operation, the system performs at least some atomic operations upon the object collection. Accordingly, in case of an impending crash, the object collection is durable and in a consistent state, and is thus available for use consistent with the object model in subsequent recovery of the versioned records management computing system. Furthermore, the visibility of the records is not affected by the record having a prior restart era. Accordingly, the entire record collection and the object collection used to operate thereon are almost immediately available. Thus, normal operations of the system to be resumed more quickly. Meanwhile, marking particular items to promote the items to the current restart era, and thereafter sweeping the unmarked items that have not been promoted to the current restart era, may be done in parallel with normal operations.

Some introductory discussion of a computing system will be described with respect to FIG. 1. Then, the operation of the versioned record management computing system will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
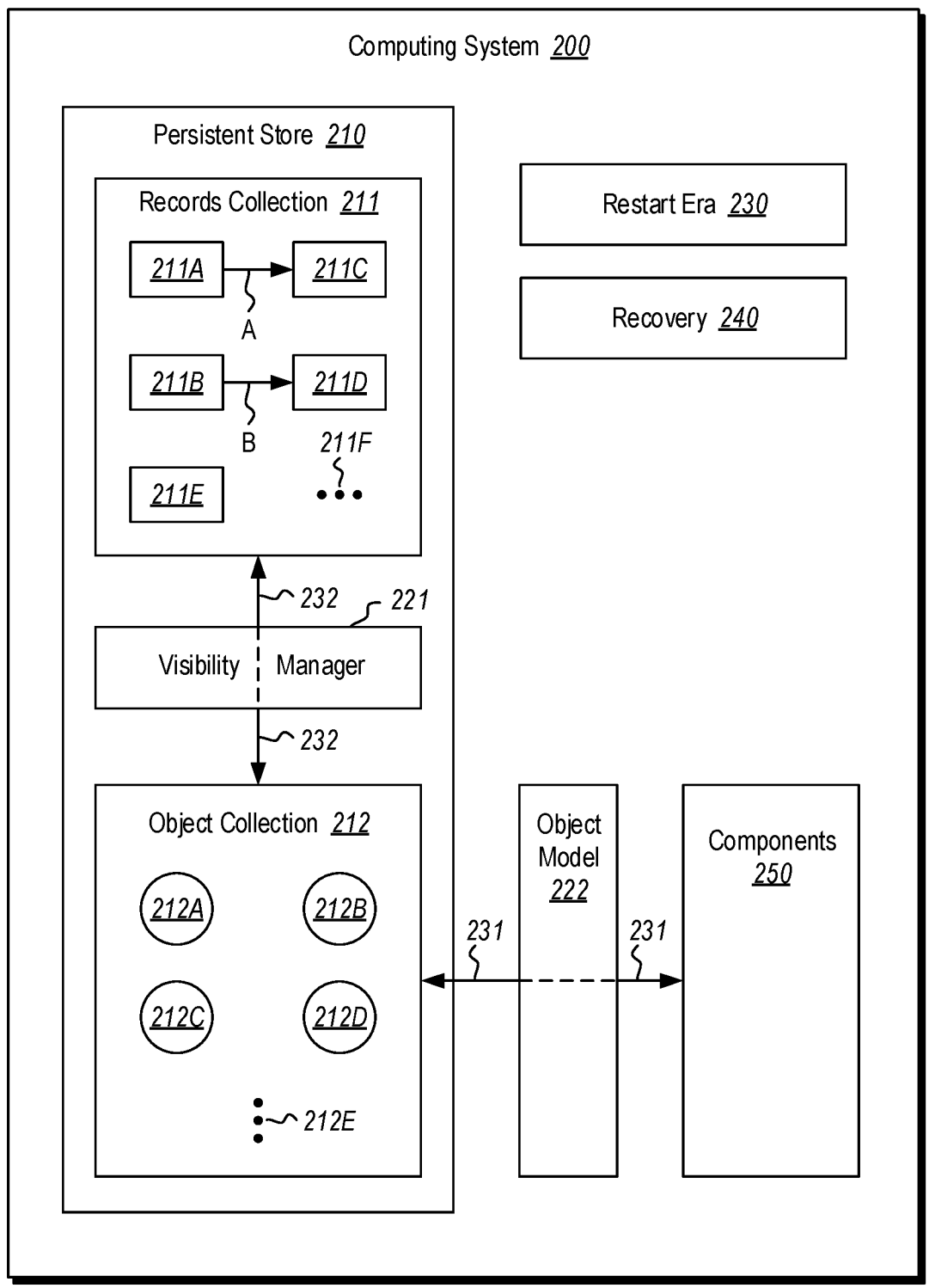
FIG. 2 illustrates a versioned records management computing system in accordance with the principles described herein, which includes a persistent store that includes a records collection and an object collection, and which also includes components that operate upon the same either in normal operation or in recovery.

FIG. 2 illustrates a versioned records management computing system 200 in accordance with the principles described herein. The versioned records management computing system 200 may, for example, be structured as described above for the computing system 100 of FIG. 1.

Typically, when a computing system is powered down, the operating system goes through routine shut down procedures so that the next time the computing system reboots, the computing system is in a clean and deterministic state so that normal operation can efficiently continue from that deterministic state.

However, sometimes computing systems simply crash, in which case for one reason or another, the computing system is not able to run through the routine shut down procedures before being powered down. For instance, the computing system might lose power unexpectedly. Alternatively, applications or operating systems may simply freeze so as to prevent running of the routing shut down procedures, thereby compelling a user to force a power down. In the case of such a crash, upon reboot, the computing system goes through recovery procedures to salvage the data that can be salvaged while maintaining a consistent state of the computing system. Often recovery operations can take noticeable time, particularly when high volumes of data are involved, such as in a database.

For instance, a log may be used to order to recover records back to a particular state. In order to do so, the last snapshot of the records is first obtained. Then, a process called "walking the log" occurs in which the logged events that occurred against the records after the snapshot are performed in order to bring the records more current. In a transactional system, some of the actions that have not yet been committed as part of the transaction may need to be undone. After this is done, all of the records that were valid prior to the crash are now again valid. However, many of the supporting structures and components that are used to operate against the records may still need to be restored in order for normal operation to proceed. It is often the restoration of these supporting structures and components that can take significant and often the majority of the recovery time.

The computing system 200 is illustrated with the state that exists on the computing system 200 at the time that a recovery reaches the point where the persistent store is again operational. Despite the inability to go through the normal shutdown routines, the computing system 200 still has an object collection 212, which includes all of the objects that are used via an object model 222 to operate upon the records of the record collection 211. The objects of the object collection 212 include those supporting structures and components that allow for normal operation upon the records collection 212. Accordingly, normal processing may begin immediately using the object collection 212 and the object model 222. This significantly speeds up the initiation of normal processing.

Furthermore, the persistent store 210 may be persistent main memory. Thus, there is little, if any, ramp up time required after normal operation begins in order to bring records and supporting structures and components into main memory. Normal operation can therefore begin quickly, and when it begins, normal operation is efficient.

The multi-versioned record collection 211 includes multiple records. For instance, the record collection 211 is shown as including five records 211A, 211B, 211C, 211D, and 211E (each represented as a small rectangle), although the ellipses 211F symbolically represent that the record collection 211 may include any number of records. The records may include any segment of data. In one embodiment, the records are each rows. There may be any number of records in the record collection, even perhaps billions or more. Regardless, the record collection includes multiple versions of data. In fact, multiple versions of a record may exist simultaneously. For instance, record 211C may represent a new version of record 211A (as symbolized by arrow A). Record 211D may represent a new version of record 211B (as symbolized by arrow B). Record 211D may perhaps just have one version for now. Accordingly, when the term "record" is used herein related to the contents of the records collection, these records may more properly be thought of a record version. For instance, record versions 211A and 211C may be collectively thought of as a record. Record versions 211B and 211D may likewise collectively be thought of as a record.

A visibility manager 221 intercedes with the records collection 211. The visibility manager 221 may access any of the records of the records collection 211. However, the visibility manager 221 may also provide a view on the records that is specific to a given time—that is, which records are valid for a given time. For instance, for a particular time, perhaps only two of the records (e.g., records 211A and 211B) are actually visible through the visibility manager 221 since at that particular time, those are the versions that validly represent the state of an piece of data (e.g., a row) at that given time. For instance, the records may have an associated begin timestamp and end timestamp that define the range of time that the record is considered to exist from the viewpoint of the applications and components (components 250 of FIG. 2) that use the record. Accordingly, given a particular time, the visibility manager 221 can determine which records are to be visible at that particular time.

The object collection 212 includes multiple objects that each conform to an object model 222. As an example only, the objects collection 212 is illustrated as including four objects 212A through 212D, although the ellipses 212E represent flexibility in the number and types of objects that conform to the object model 222. Components 250 use the object model 222 in order to interface with (as represented by arrow 231 the objects of the object collection 212. The objects in the object collection 212 respond by interfacing (as represented by arrow 232) with the records of the records collection 211. An example of such an object is an index that maps a record (e.g., a row) of the records collection 211 to a record group (e.g., a table).

More generally speaking, the object model 222 may be used by applications, components, operating systems, and so forth, in order to perform operations on the records of the records collection 211. By walking the log from the last checkpoint, conventional recovery ensures that all of the records that were valid and visible at any given time prior to the crash remain valid and visible at that time after the crash. However, unlike prior recovery technology, on recovery, the object collection 212 is already valid in that the object model 222 can be used immediately to perform operations on any valid record of the record collection 211. The object collection 212 does not need to be rebuilt to be operable with the object model 222. It is already in such a state.

In order to allow this to be the state of the object collection 212 at the beginning of recovery, the object collection 212 may at all normal operation times be in a persistent main memory. All operations performed using the objects are performed using the objects as they exist in the persistent main memory. In another embodiment, the object collection 212 is permitted to be in a volatile cache during normal operation. However, if the computing system 200 detects an impending crash, at least a portion of that volatile cache (e.g., a cache coherency domain) is quickly saved into the persistent main memory.

In any case, the end result is the same—the object collection 212 is in the persistent store 210 during the recovery and is immediately usable via the object model 222, and such that the objects are in a known location upon restart. Furthermore, in some embodiments, the operations upon the objects themselves are atomic and lock-free, therefore providing that each of the objects in the object collection 212 will be consistent, and not in a mid-operation state.

Figure 3:
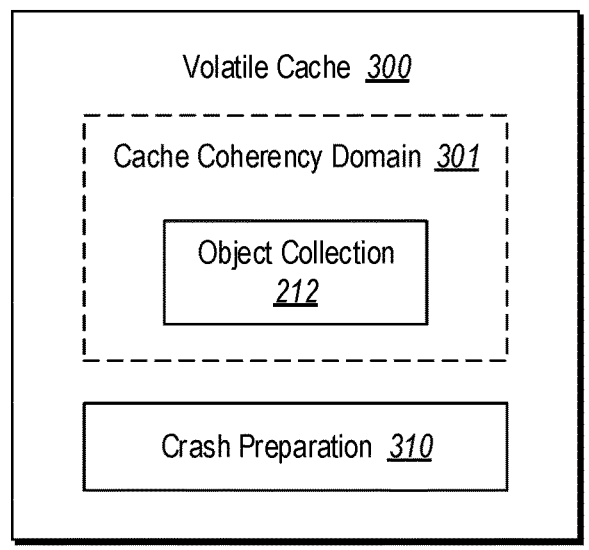
FIG. 3 illustrates a volatile cache that includes a cache coherency domain, and at least part of an object collection.

For instance, FIG. 3 illustrates a volatile cache 300 that includes a portion 301 that includes at least part of object collection 212. In the state, the object model 222 may be used to control the object collection. The volatile cache further has a crash preparation structure 310 that detects imminent crash conditions, and places the content of the portion 301 into the persistent store 210 in a manner that the object model 222 can still be used against the object collection 212 in the persistent store 210. However, there are other ways of ensuring that the object collection 212 is within the persistent store 210 during the next restart. For instance, there could be a shadow copy of the cached object collection within a persistent main memory or within a log. Alternatively, the cache itself could be durable across restarts.

The persistent store 210 also has associated with it a restart era 230. The restart era is an identifier that is changed every time the system 200 recovers from a crash. Accordingly, the restart era 230 uniquely identifies an era of time bounded on each side by a recovery. At any given time, the restart era 230 is the current restart era.

Figure 4:
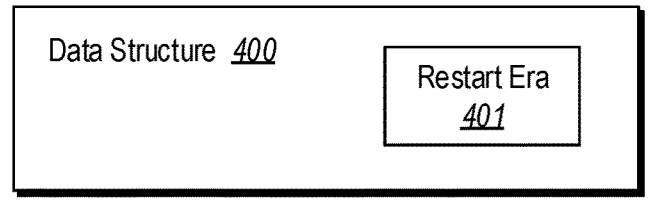
FIG. 4 schematically illustrates a data structure that has an associated restart era that represents a period of time between recoveries.

Each of the items in the persistent store 210 has a restart era identifier associated therewith, which is not necessarily the same as the restart era of the current restart era 230. For instance, FIG. 4 schematically illustrates a data structure 400 that has an associated restart era 401. The data structure 400 may represent any of the records of the record collection 211 and any of the objects in the object collection 212. Any new record that is created in the current restart era has its restart era marked as the current restart era. On the other hand, the visibility manager 221 does not use the restart era 401 of a record to determine whether the record is currently visible. Thus, the entire record collection 211 is almost immediately available for normal operations. Furthermore, since the object collection 212 is stored in persistent memory, the object collection 212 is available upon restart for normal operations using the object model 222. Thus, normal operations may proceed almost immediately with minimal work. For instance, there may be some work to connect tables and indices to their memory allocators.

Figure 5:
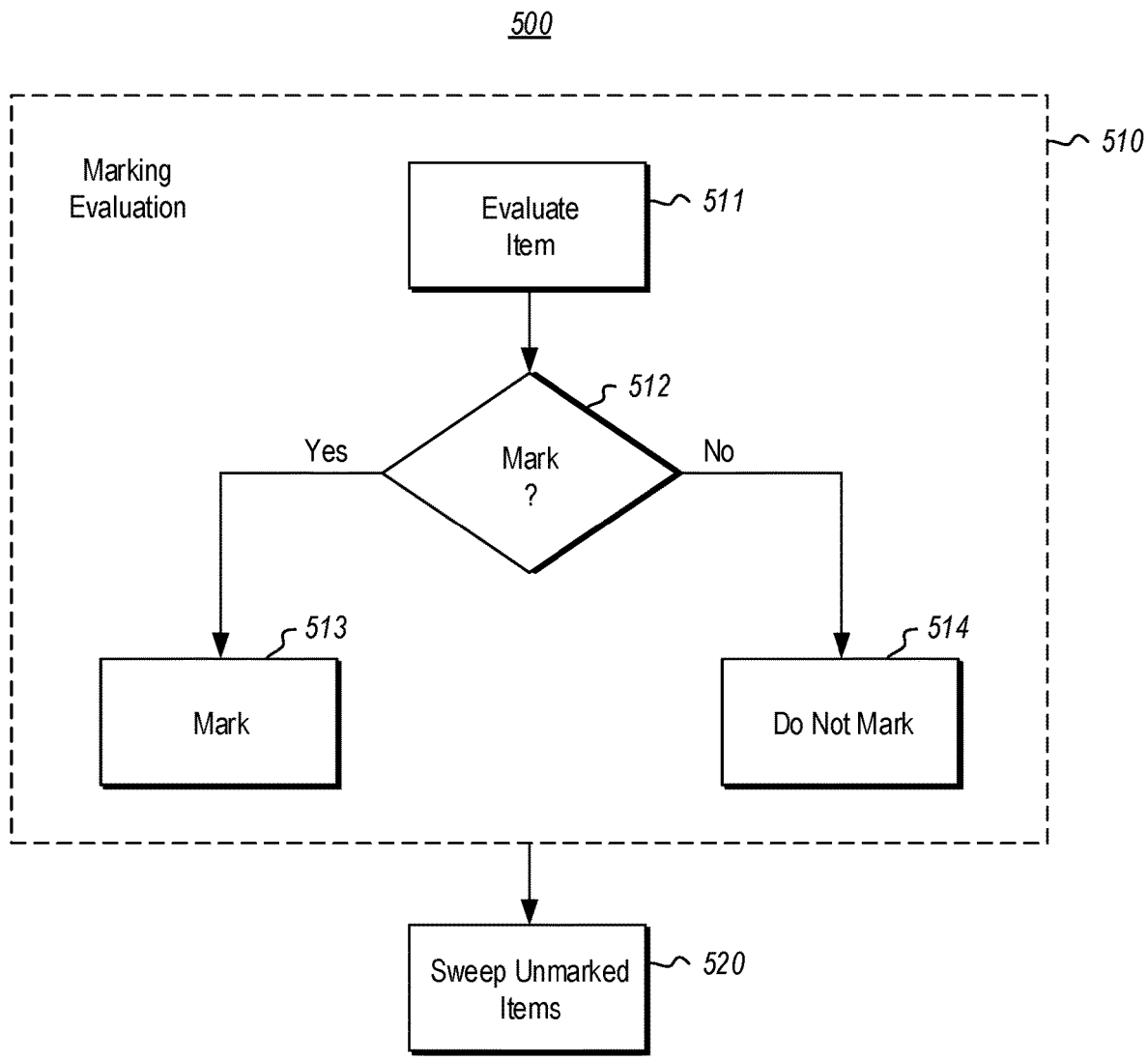
FIG. 5 illustrates a flowchart of a method for promoting at least some of the plurality of records to the current restart era in accordance with the principles described herein.

While the restart era 230 of the persistent store is changed upon recovery operations beginning, the determination of an appropriate restart era 401 for each of the records may be determined in parallel with normal operations. FIG. 5 illustrates a flowchart of a method 500 for promoting at least some of the plurality of items (e.g., records or objects) to the current restart era in accordance with the principles described herein. Recall that this may be performed in parallel with normal operation as a background process. During normal operations, if a record is created, this record is automatically given a restart era 401 equal to the current restart era 230.

The first part of the method 500 is marking evaluation 510 and is represented by the collective acts within the dashed-lined box 510. The marking evaluation 510 is performed for each item (e.g., record or object) that does not have a restart era 401 of the current restart era 230. A recovery component (e.g., recovery component 240 of FIG. 2) evaluates the record (act 511) to determine whether or not the item should be marked (decision block 512). If the record should be marked ("Yes" in decision block 512), the record is marked (act 513), by promoting the item to the current restart era. For instance, marking might occur by changing the restart era 401 of the item to be the current restart era 230. If the item is not to be marked ("No" in decision block 512), the record is not marked (act 514). For instance, refraining from marking the item (act 514) may simply involve not changing the restart era 401 of the item.

After the marking evaluation (act 510) is performed on all of the items that do not have the current restart era, the unmarked items are then swept (act 520) from the persistent memory. In other words, the persistent store is scanned for items, and for each item that does not have the current restart era, the item is deleted.

Figure 6:
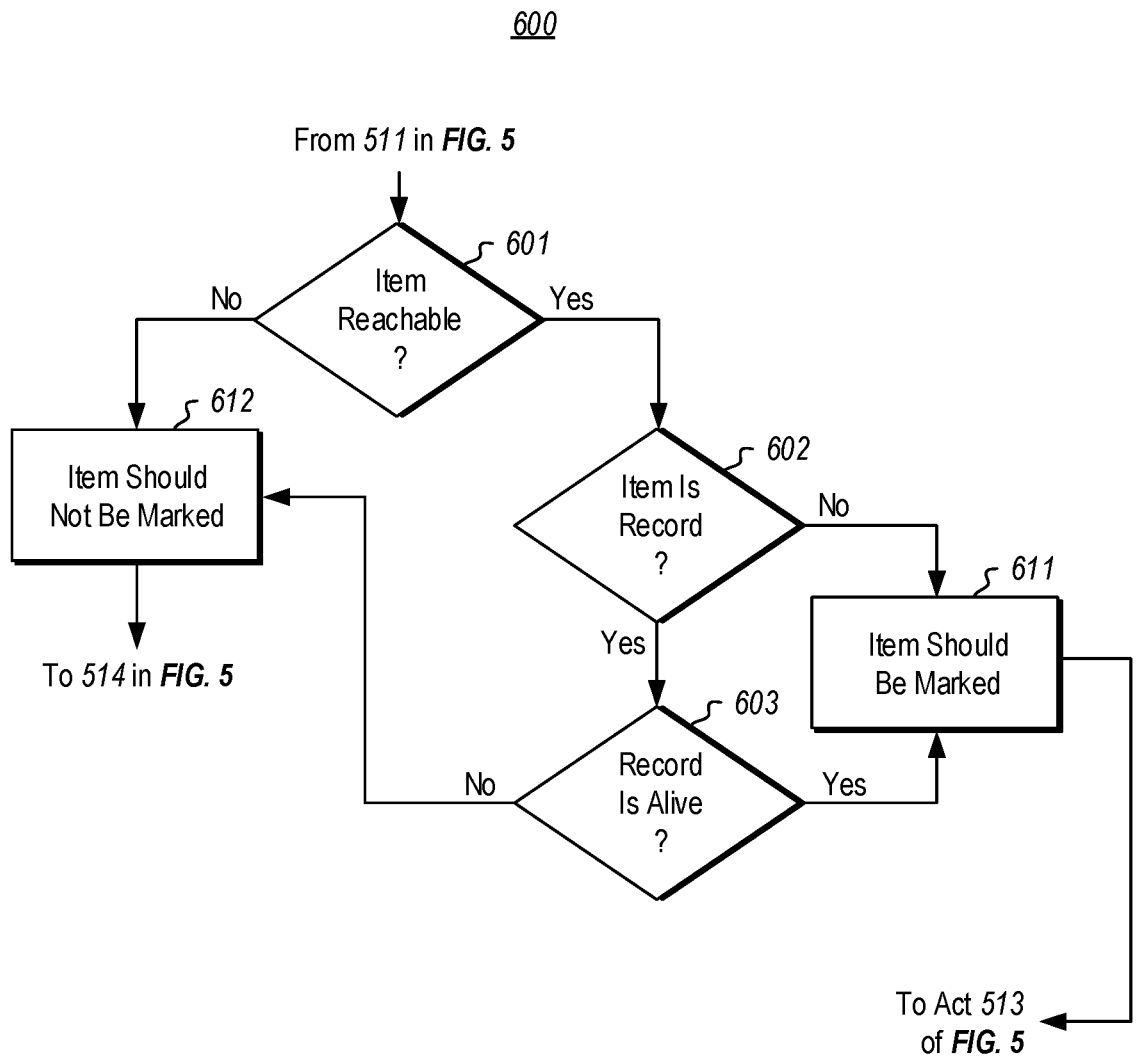
FIG. 6 illustrates a flowchart of a method for evaluating a particular record to determine whether the record should be marked.

FIG. 6 illustrates a flowchart of a method 600 for evaluating a particular item to determine whether the record should be marked. The method 600 represents an example of how the decision of decision block 512 may be accomplished.

First, the recovery component determines whether the particular item is reachable via the object collection (decision block 601). For instance, this reachability analysis may be performed for all items by scanning through the object collection (e.g., the indices in the case of a database) to determine if there is any way to reach the particular item. If the particular item is reached via scanning of the object collection ("Yes" in decision block 601), then perhaps this is the conclusion of the analysis that determines that the item should be marked (act 611). In one embodiment, however, in the case of the item being a record ("Yes" in decision block 602), the analysis further evaluates whether or not the record is visible to any active process (e.g., any active transaction). That is, it is determined whether the record is still alive (decision block 603). If the record is referred to by an active process ("Yes" in decision block 603), then the record is to be marked with the current restart era (act 611). Accordingly, if the item is not reachable ("No" in decision block 601), or is a record that is not alive ("Yes" in decision block 602 and "No" in decision block 603), then the record is not to be marked (act 612). On the other hand, if the item is reachable ("Yes" in decision block 601), and is not a record ("No" in decision block 602), then the item is marked (act 611). If the item is a record that is reachable and alive ("Yes" in all of decision blocks 601 through 603), then the records is to be marked (act 611).

In a transactional system, in order to determine whether a record is alive, it may be necessary to determine whether or not the transaction that created or deleted the record has committed. If, for instance, a record was created by a transaction, then whether the record is valid rests on whether the transaction committed. If the transaction committed, the created record is potentially valid (alive) if there are still active transactions that may reference the created record. If the transaction did not commit, then the record is invalid (not alive). If the record was deleted by a transaction, then whether the record is valid again rests on whether the transaction committed. If the transaction committed, the deleted record is invalid (not alive). If the transaction did not commit, then the deleted record was not really deleted and the record is still valid (alive).

The determination of whether a transaction has committed or not may be implemented in any number of ways. For instance, the commit status of a transaction could be stored durably in persistent memory and kept until the information is no longer needed. Also, the information may be found in a log or potentially a durable cache. The commit status may thus be looked for in these durable areas.

In the above-described embodiments, all or most record versions that are reachable through an index have their restart era fields updated to the current restart era. There is an alternate embodiment that does not require updating of the restart era fields of all reachable record versions. The avoidance of such updating is beneficial as writing to a record version can consume computing resources, and there may be many record versions from prior restart eras that are reachable via indices. In the alternate embodiment, non-record objects (such as objects within the object collection 212) are marked as described. However, marking is not performed in the marking stage as described above for record versions within the record collection 211. Instead, during the sweeping stage, the record versions are evaluated, and the restart era updated in relatively few records. This alternative embodiment uses the fact that the restart era of a record version is largely ignored when determining visibility of the record.

In this alternative embodiment, during the sweep phase, the recovery module reads each record version. If the restart era of the record version is the current restart era, the record version is ignored by the sweep phase. However, if the record has a prior restart era, the sweep mechanism distinguishes between record versions that may still be visible, and those that cannot (and thus are garbage and should be swept up). It does so considering the begin timestamp and the end timestamp of the record. The begin timestamp represents the commit time of the transaction that created the record. The end timestamp represents the commit time of the transaction that deleted the record, or is infinity if the record has not yet been deleted. A record is visible at a given time if that given time falls between the times expressed in the begin and end timestamps. If the transaction that creates the record is still in process, the begin timestamp is populated with the transaction identifier of that transaction. If the transaction that deletes the record is still in process, the end timestamp is populated with the transaction identifier of that transaction. These transaction identifiers are relative to the restart era of the record version.

For those record versions of a prior restart era, if there is a valid begin timestamp (a time), and there is an infinity end timestamp, that record version may be visible and it may optionally be left alone without updating its restart era. For those record versions of a prior restart era, if there is a transaction identifier in the begin timestamp and if that transaction from a prior restart era committed but its commit postprocessing never completed, then the begin timestamp of the record version is updated to the begin timestamp of the transaction, otherwise the row version is submitted for deletion. For those record version of a prior restart era, if there is a transaction identifier in the end timestamp, and if that transaction from a prior restart era committed but its commit postprocessing never completed, then the record version is submitted for deletion, otherwise the end timestamp of the record version is set back to infinity.

Before a record version from a prior restart era can be deleted, it is made unreachable. If it is not marked free, then its end timestamp is either a timestamp of an infinity mark. In this case, the record version may be reachable via some number of indices, and each index is asked whether the record is reachable by it, and if the record version is reachable, to remove it. Once all indices have confirmed that the record version is not reachable, then the record version is not reachable at all, and the record version may be reclaimed. Before reclaiming, the record version is first promoted to the current restart era, then marked free, and the unit of storage that previously held the record version is then put on the appropriate free list.

Accordingly, the principles described herein provide a mechanism for quickly recovering from a crash using a persistent store. The supporting structures and components for operating upon records are immediately available upon recovering valid representations of the records. Furthermore, if the persistent store is main memory itself, there is little, if any, ramp up time in normal operation. Accordingly, more efficient initiation of normal operation is accomplished.

Also in parallel with normal operation, the state of the objects of the object collection 212 may also be cleaned up as will now be described. In this example, suppose that the records being written are rows in a database, and that the system is transactional. Furthermore, suppose the rows have the begin timestamp and end timestamp mentioned above in order to support multi-versioning. An update transaction in progress handles the atomic switch from uncommitted to committed by recording its transaction ID in the begin timestamp field of any row version it creates and in the end timestamp field of any row version it deletes. The system keeps lists (hereinafter called "the write set") of all such created and deleted row versions. After the transaction has committed (as recorded in the durable log or log cache), commit post-processing for that transaction rewrites its transaction IDs in their timestamps with its commit time stamp. After post-processing is complete, the write set is used to submit any deleted row versions for delete processing.

There is thus a small window in this implementation during which an update transaction has committed but commit post-processing is not yet complete. After a crash in that window, commit post-processing of that transaction is completed after restart. A log buffer in the persistent main memory records that post-processing of an update transaction is incomplete. It holds the restart era, the transaction ID, a "Valid" bit, a "Committed" bit, a "CommitTimeStamp" and may contain a copy of the transaction write set. The update transaction is made valid as late as possible before the transaction is committed and is made invalid again as soon as possible after post-processing is complete.

At the beginning of recovery, valid log buffers are gathered into a log buffer cache (e.g. hash table indexed by the transaction ID) and, if necessary, a separate authority (the tail of the log) determines whether the transaction represented by each valid log buffer had committed and at what commit timestamp. Uncommitted log buffers can be purged from the cache, if desired, before normal transaction processing is resumed.

Upon encountering a transaction identifier in a row version timestamp, if it is a transaction ID is from the current restart era, the transaction is processed normally. If the transaction ID is from a prior restart era for which there is a valid, committed log buffer in the log buffer cache, then commit post-processing is still owed and the transaction ID is replaced by the commit time stamp. If the end time stamp was overwritten, the row version was deleted and it is submitted for delete processing for row versions from prior restart eras. If the transaction identifier is from a prior restart era for which there is no valid, committed log buffer in the log buffer cache, then abort post-processing is still owed and the transaction identifier is replaced by an appropriate FOREVER timestamp. If the begin time stamp was overwritten with a transaction ID from a prior restart era and the transaction has not committed, the row version was never created and it is submitted for delete processing for row versions from prior restart eras.

Transaction write sets may be preserved in the persistent main memory. These can be used to post-process the indicated row versions immediately. Any row versions named in preserved write sets of aborted or uncommitted transactions can also be processed immediately. The log buffer cache can be released as soon as all row versions from committed (but un-post-processed) transactions have been post-processed.

In case write sets are not preserved, a full scan over all row versions applies lazy post-processing to all row versions from previous restart eras left dangling by a crash. As described above, this can be done in parallel with normal transaction processing in the new restart era. Any log buffer cache still remaining when the scan is complete can be deleted at that time.

A transaction ID is relative to a single restart era and a transaction ID generator is reset at the start of each restart era. The restart era is thus logically the high order bits of the transaction ID, but it may be inconvenient to update both the transaction ID and restart era together atomically. To facilitate atomic updates of transaction IDs (e.g. via compare-and-swap) from transaction ID to timestamp during lazy post-processing, transaction ID generation may suppress duplicates that survive from prior restart eras (i.e. that are valid and committed in the log buffer cache).

Normal commit and abort post-processing (of the current restart era) is only done by the worker thread executing the transaction. Lazy post-restart post-processing may be done concurrently, so the transaction ID to timestamp transition must be atomic (e.g. via compare-and-swap).

Note that commit post-processing (overwriting transaction IDs with timestamps) is idempotent and that post-processing of current restart era transactions do not conflict with post-processing of transactions from prior restart eras. Post-processing of row versions from prior restart eras can be done by any thread at any time, requiring only access to the log buffer cache if any row versions belonging to committed but not post-processed transactions may still remain. It can occur during visibility checking, which requires it to resolve the transaction ID to a timestamp.

Each row version has a single restart era field. By the allocator invariants, the row version comes from the allocator with this field set to the current restart era and the transaction ID of the creating transaction is put in the begin timestamp field while the row version is still marked free. Once the transaction commits and has been post-processed, the restart era field is largely ignored. When a subsequent transaction wants to delete the row version (including updating the row by replacing this row version with a newer one), the row version may still have a transaction ID from the current restart era in the begin time stamp field, but any transaction ID from a prior restart era will already have been post-processed to a timestamp. So the restart era field of the row version is either already the current restart era, or it is ignored and it is updated atomically (e.g. via compare-and-swap) to the current restart era before the end time stamp of the row version is updated atomically to the transaction ID of the deleting transaction.

The restart era field of a row version thus records the most recent of the restart era in which it was created or that of the most recent attempt to delete it. It is ignored while the row version is visible. If the row version is not visible (including free and deleted) and if its restart era is the current restart era, then normal mechanisms manage its lifetime. If the row version is not visible (including free and deleted) and is from a prior restart era, it is submitted for delete processing for row versions from prior restart eras.

In addition to resolving any residual post-processing of row version transaction IDs from prior restart eras, the above full scan over all row versions also submits any sufficiently antique row versions for delete processing for row versions from prior restart eras.

Delete processing of row versions from prior restart eras may differ in some details from normal delete processing in the current restart era. Each row version referenced from some number of indices as proscribed by the definition of the table to which it belongs. The count of such indices that a row version is currently on is kept in the header of the row version and is correct in normal processing (the current restart era). It is used as a reference count, with normal delete processing repeatedly attempting to remove the row version from all of its indices until no references remain, at which point the row version can be freed.

When a crash may have occurred during an index insert or remove operation, the count may be incorrect, and delete processing for row versions from prior restart eras probes each index to determine whether the row version can reach it, attempting to remove it if so. When the row version remains on no more indices, it can be marked FREE in the current restart era and returned to the appropriate free list.

Every slot contains a restart era field that is valid even when the slot is free. All slots in a single super block have the restart era field at the same offset from the base of the slot. Allocation is only allowed from valid/current free lists. In other words, those lists marked as belonging to the current restart era and which can only contain free slots that are marked as belonging to the current restart era. Any slot allocated by a current/valid free list is already be marked with the current restart era when allocated. Any slot freed into a valid/current free slot is marked with the current restart era before being pushed onto the free list. Any slot on the free list is marked with the current restart era.

The free list count of a valid/current free list is eventually accurate. The free list count and free list head are updated atomically, but not together, so there is a small window where one has been updated before the other. Some of the free list count may be kept in a separate active quota. In normal operation, a correct count can always be determined. After a crash, the free list count is recomputed by counting the slots on the free list before the free list can be marked valid/current.

A memory allocator superblock that was active at the time of a crash is put back on the partial list. The memory allocator superblock is not valid/current because its free list count is not known to be correct. A memory allocator superblock is made valid/current lazily before the first attempt to allocate from it. A memory allocator superblock is made valid/current by counting the slots on its free list and marking them all with the current restart era. The correct free list count and current restart era are then recorded in the memory allocator superblock header. This is done by a thread that has exclusive write access to the superblock.

A memory allocator superblock has the following states in order during its lifetime: FREE; ALLOCATING—superblock header being initialized by an exclusive writer; ENQUEUEING—the memory allocator superblock header valid, being inserted into (doubly linked) list of SBs belonging to a particular size and class; ALLOCATED FOR {ROWS, INDICES, LOG BUFFERS}; DEQUEUEING—memory allocator superblock header valid, being removed from (doubly linked) list of SBs belonging to a particular SizeClass; FREEING—formerly memory allocator superblock header being overwritten by free superblock pattern; and then FREE again.

During recovery from crash, ALLOCATING, FREEING, ENQUEUEING and DEQUEUEING are transition states that converted to FREE during crash recovery. FREE memory allocator superblock only require updating their restart era field to current. ALLOCATED memory allocator superblock need their free lists made current and eventually need to be swept for garbage from prior restart eras. ALLOCATING and FREEING memory allocator superblock headers are cleared so that they are unambiguously free, marked FREE and returned to the PMM superblock allocator free list. ENQUEUEING and DEQUEUEING memory allocator superblock may or may not be on the SizeClass (doubly linked) list of SBs. The list is scanned for them and they must be removed if found. They are then freed as for ALLOCATING and FREEING, above. All FREE memory allocator superblock have valid memory allocator superblock headers that are marked free and have a restart era field.

Memory allocator superblock state is recorded in a combination of signatures and flags. All of this cleanup of memory allocator superblock after a crash is done lazily and concurrently with normal transaction processing.

Recovery of code protected by critical seconds and exclusive write regions (e.g. the WO of WORM locks). The system may be mostly lock-free, but there are a few infrequent updates that are protected by regions guaranteeing exclusive write access. When the memory accessed by such regions is in persistent main memory, they should be carefully coded so that they can be recovered after a crash. They are written in a transactional style while holding the lock, whereby the lock is grabbed for exclusive access, a commit variable is initialized to UNCOMMITTED, enough old state is preserved to allow rollback, if required, a new state is computed but not installed, the commit variable is changed to COMMITTED, the new state is installed via an idempotent computation, the commit variable is set to ALLDONE and the lock dropped.

On restart, UNCOMMITTED regions are rolled back and COMMITTED regions are rolled forward. All regions are set to "no one inside". This must be done by a thread with exclusive write access, and is done before normal transaction processing is resumed. If necessary, a thread might get exclusive access by spin-locking with <<CurrentRestartEra, ThreadId>> atomic update.

Accordingly, the principles described herein provide an effective mechanism to quickly recover from a crash. This is because the object collection is quickly available for operating with via the object model.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A versioned records management computing system, comprising:
one or more processors; and
one or more computer-readable storage devices having stored thereon computer-executable instructions that are executable to cause the versioned records management computing system to recover the versioned records management computing system in response to a crash, the computer-executable instructions further including instructions to cause the computing system to perform the following:
generate a persistent store that includes a plurality of items that are each marked with a restart era, wherein any item that was created in the current restart era is marked with the current restart era, the persistent store including a first subset of the plurality of items comprising a plurality of records, at least one of the plurality of records including multiple corresponding versions, the persistent store also including a second subset of the plurality of items comprising a collection of objects that conform to an object model such that the object model is used to operate upon the plurality of records via the object collection; and
recover from a crash, including promoting at least one of the plurality of items in the persistent store to the current restart era in parallel with normal operation of the versioned records management computing system following the crash.

2. The versioned records management computing system in accordance with claim 1, the recovery component operating during normal operation by performing the following:
evaluating each of at least one of the plurality of items; and
as a result of evaluating, marking the evaluated items by promoting at least one of the evaluated items to the current restart era by changing the restart era of the promoted items to the current restart era, and refraining from changing the restart era of at least some of the evaluated items.

3. The versioned records management computing system in accordance with claim 2, wherein the persistent store is scanned and items from a prior restart era are deleted from the persistent store.

4. The versioned records management computing system in accordance with claim 2, wherein evaluating each of at least one of the plurality of items comprises:
determining that the at least one item is not reachable via the object collection; and
as a result of determining that the at least one item is not reachable via the object collection, refraining from changing the restart era of the at least one item.

5. The versioned records management computing system in accordance with claim 2, the computer-executable instructions further including instructions to cause the computing system to perform the following:
determine that the at least one item is a particular record of the record collection;
determine that the particular record is reachable via the object collection;
determine that the particular record is not visible via a versioned records management component; and
refrain from changing the restart era of the particular record as a result of determining that the particular record is not visible via the versed records management component.

6. The versioned records management computing system in accordance with claim 5, determining that the particular record is not visible comprising:
determining that the particular record was created as part of a transaction that did not commit.

7. The versioned records management computing system in accordance with claim 5, determining that the particular record is not visible comprising:

determining that the particular record was deleted as part of a transaction that did commit.

8. The versioned records management computing system in accordance with claim 2, evaluating each of at least one of the plurality of items comprising:
   determining that the at least one item is reachable via the object collection; and
   as a result of at least determining that the at least one item is reachable via the object collection, changing the restart era of the at least one item to the current restart era.

9. The versioned records management computing system in accordance with claim 2, the computer-executable instructions further including instructions to cause the computing system to perform the following:
   determine that the at least one item is a particular record of the record collection;
   determine that the particular record is reachable via the object collection;
   determine that the particular record is visible via a versioned records management component; and
   as a result of determining, change the restart era of the particular item to the current restart era.

10. The versioned records management computing system in accordance with claim 1, the at least one promoted item being a record of the plurality of records.

11. The versioned records management computing system in accordance with claim 10, the at least one promoted item being an object of the object collection.

12. The versioned records management computing system in accordance with claim 1, the at least one promoted item comprising a row or column.

13. The versioned records management computing system in accordance with claim 1, the object collection including at least one index for the plurality of records.

14. The versioned records management computing system in accordance with claim 1, the object collection including all of the indices associated with the plurality of records.

15. The versioned records management computing system in accordance with claim 1, wherein operations performed upon the plurality of items are atomic and lock-free.

16. The versioned records management computing system in accordance with claim 1, a version of a record of the plurality of records being defined by a begin timestamp and an end timestamp, wherein the version of the record is visible at a particular time if the particular time is between the begin timestamp and the end timestamp.

17. The versioned records management computing system in accordance with claim 1, the persistent store comprising persistent main memory.

18. The versioned records management computing system in accordance with claim 17, the object collection model also comprising the persistent main memory.

19. A method, implemented at a computing system including one or more processors, for recovering a versioned records management computing system having a restart era that changes when the versioned records management computing system recovers from a crash, the method comprising:
   generating a persistent store that includes a plurality of items that are each marked with a restart era, wherein any item that was created in the current restart era is marked with the current restart era, the persistent store including a first subset of the plurality of items comprising a plurality of records, at least one of the plurality of records including multiple corresponding versions, the persistent store also including a second subset of the plurality of items comprising a collection of objects that conform to an object model such that the object model is used to operate upon the plurality of records via the object collection; and
   recovering from a crash, including promoting at least one of the plurality of items in the persistent store to the current restart era in parallel with normal operation of the versioned records management computing system following the crash.

20. A computer program product comprising one or more computer-readable storage devices having stored thereon computer-executable instructions that are structured such that, when executed by one or more processors of a computing system, cause the computing system to recover versioned records of the computing system in response to a crash, the computer-executable instructions further including instructions to cause the computing system to perform the following:
   generate a persistent store that includes a plurality of items that are each marked with a restart era, wherein any item that was created in the current restart era is marked with the current restart era, the persistent store including a first subset of the plurality of items comprising a plurality of records, at least one of the plurality of records including multiple corresponding versions, the persistent store also including a second subset of the plurality of items comprising a collection of objects that conform to an object model such that the object model is used to operate upon the plurality of records via the object collection; and
   recover from a crash, including promoting at least one of the plurality of items in the persistent store to the current restart era in parallel with normal operation of the versioned records management computing system following the crash.

* * * * *